United States Patent
Ghanem et al.

(10) Patent No.: US 9,361,524 B2
(45) Date of Patent: Jun. 7, 2016

(54) SYSTEM AND METHOD FOR CROWD COUNTING AND TRACKING

(71) Applicant: King Abdullah University of Science and Technology, Thuwal (SA)

(72) Inventors: Bernard Ghanem, Thuwal (SA); Jens Schneider, Thuwal (SA); Mohamed Shalaby, Thuwal (SA); Usama Elnily, Thuwal (SA)

(73) Assignee: KING ABDULLAH UNIVERSITY OF SCIENCE & TECHNOLOGY, Thuwal (SA)

( * ) Notice: Subject to any disclaimer, the term of this patent is extended or adjusted under 35 U.S.C. 154(b) by 0 days.

(21) Appl. No.: 14/518,981

(22) Filed: Oct. 20, 2014

(65) Prior Publication Data
US 2016/0110613 A1   Apr. 21, 2016

(51) Int. Cl.
*G06K 9/00* (2006.01)
*G06T 7/00* (2006.01)
*G06K 9/62* (2006.01)

(52) U.S. Cl.
CPC ........ *G06K 9/00778* (2013.01); *G06K 9/00369* (2013.01); *G06K 9/6202* (2013.01); *G06T 7/0065* (2013.01); *G06T 7/0081* (2013.01); *G06T 7/0097* (2013.01); *G06T 2207/10021* (2013.01); *G06T 2207/20144* (2013.01); *G06T 2207/30196* (2013.01); *G06T 2207/30232* (2013.01); *G06T 2207/30242* (2013.01)

(58) Field of Classification Search
USPC ....................................................... 382/103
See application file for complete search history.

(56) References Cited

U.S. PATENT DOCUMENTS

| | | | |
|---|---|---|---|
| 5,866,887 A | 2/1999 | Hashimoto et al. | |
| 7,003,136 B1 | 2/2006 | Harville | |
| 7,590,262 B2 | 9/2009 | Fujimura et al. | |
| 8,401,225 B2 | 3/2013 | Newcombe et al. | |
| 2005/0201612 A1 | 9/2005 | Park et al. | |
| 2006/0269103 A1* | 11/2006 | Brown ............... | G06K 9/00778 382/103 |

(Continued)

FOREIGN PATENT DOCUMENTS

| | | |
|---|---|---|
| JP | 2003-091714 A | 3/2003 |
| KR | 2010-0093797 A | 8/2010 |

OTHER PUBLICATIONS

Prathiba et al., "Literature survey for people counting and human detection," IOSR Journal of Engineering (Jan. 2013) 3 (1): 05-10.

(Continued)

*Primary Examiner* — Yon Couso
(74) *Attorney, Agent, or Firm* — Billion & Armitage; Michael A. Collins (57) ABSTRACT

A video analytic system includes a depth stream sensor, spatial analysis module, temporal analysis module, and analytics module. The spatial analysis module iteratively identifies objects of interest based on local maximum or minimum depth stream values within each frame, removes identified objects of interest, and repeats until all objects of interest have been identified. The temporal analysis module associates each object of interest in the current frame with an object of interest identified in a previous frame, wherein the temporal analysis module utilizes the association between current frame objects of interest and previous frame objects of interest to generate temporal features related to each object of interest. The analytics module detects events based on the received temporal features.

35 Claims, 6 Drawing Sheets

(56) References Cited

U.S. PATENT DOCUMENTS

| | | |
|---|---|---|
| 2007/0003141 A1* | 1/2007 | Rittscher ............ G06K 9/00778 382/181 |
| 2008/0118106 A1 | 5/2008 | Kilambi et al. |
| 2008/0212099 A1* | 9/2008 | Chen ...................... G06T 7/20 356/408 |
| 2010/0027875 A1 | 2/2010 | Hampapur et al. |
| 2011/0176000 A1 | 7/2011 | Budge et al. |
| 2011/0279685 A1* | 11/2011 | Alahi ................ G06K 9/00624 348/187 |
| 2013/0015355 A1 | 1/2013 | Noone et al. |
| 2013/0016879 A1 | 1/2013 | Baele et al. |
| 2013/0182904 A1 | 7/2013 | Zhang et al. |
| 2013/0266174 A1 | 10/2013 | Bleiweiss et al. |
| 2014/0029788 A1 | 1/2014 | Kang |
| 2014/0072170 A1* | 3/2014 | Zhang ................ G06K 9/00369 382/103 |
| 2014/0139633 A1 | 5/2014 | Wang et al. |

OTHER PUBLICATIONS

International Search Report (Form PCT/ISA/210) for corresponding International Application No. PCT/US2014/061414 mailed on Jul. 7, 2015.

Written Opinion (Form PCT/ISA/237) for corresponding International Application No. PCT/US2014/061414 mailed on Jul. 7, 2015.

* cited by examiner

SYSTEM AND METHOD FOR CROWD COUNTING AND TRACKING

TECHNICAL FIELD

The present disclosure relates to systems and methods of tracking and counting people in a crowd.

BACKGROUND

While surveillance cameras have been utilized in a variety of applications for many years, the ability to analyze video data via video analytics systems has dramatically increased the capability of the surveillance camera. For example, video analytic systems may be utilized to automatically detect and track users within the field of view of the surveillance camera. This type of video analytic system may be particularly useful in applications in which it is desired to get a "count" of the number of users passing through a particular region. However, the accuracy of such systems depends not only on the particulars of the video analytic system but also on the environment in which the system is installed. A system that works well in one environment may struggle to operate as well in another environment. For example, a video analytic system that relies on visible light video data may work well during the day, but may struggle to identify users or people during low-light or night conditions.

There is therefore a need to continue to improve the capability of video analytic systems to operate accurately in a variety of applications/conditions.

SUMMARY

According to one embodiment, a video analytic system includes a depth stream sensor, a spatial analysis module, a temporal analysis module, and an analytics module. The depth stream sensor is configured to collect depth stream data. The spatial analysis module is connected to receive and analyze the depth stream data on a frame by frame basis, wherein the spatial analysis module iteratively identifies objects of interest based on local maximum or minimum depth stream values within each frame, removes identified objects of interest, and repeats until all objects of interest have been identified. The temporal analysis module is connected to receive objects of interest identified by the spatial analysis module in a frame, wherein the temporal analysis module associates each object of interest in the current frame with an object of interest identified in a previous frame, wherein the temporal analysis module utilizes the association between current frame objects of interest and previous frame objects of interest to generate temporal features related to each object of interest. The analytics module is connected to receive the temporal features generated by the temporal analysis module, wherein the analytics module detects events based on the received temporal features.

According to another embodiment, a crowd-counting device includes a depth stream sensor, a spatial analysis module, a temporal analysis module, and an analytics module. The depth stream sensor is configured to capture frames of depth stream data that indicate at each pixel a depth or distance to the depth stream sensor. The spatial analysis module is connected to receive depth stream data captured by the depth stream sensor, wherein the spatial analysis module analyzes each frame of depth stream data to identify objects corresponding with user's heads, wherein the spatial analysis module, wherein the spatial analysis module utilizes a minimum depth pixel to identify a top portion of a user's head, flood fills pixels surrounding the minimum depth pixel corresponding with the user's head, removes the portion representing the user's head from the frame, and iteratively repeats the process until all objects have been identified and removed from the frame, wherein for each identified user head the spatial analysis module creates an output vector that identifies features associated with the user's head. The temporal analysis module is connected to receive the output vectors generated by the spatial analysis module, wherein the temporal analysis module compares output vectors generated with respect to a current frame with output vectors generated with respect to a previous frame in order to generate attributes of location and direction with respect to each detected user head. The analytics module increments and decrements a count of users based on location and direction information provided by the temporal analysis module.

DETAILED DESCRIPTION

Figure 1:
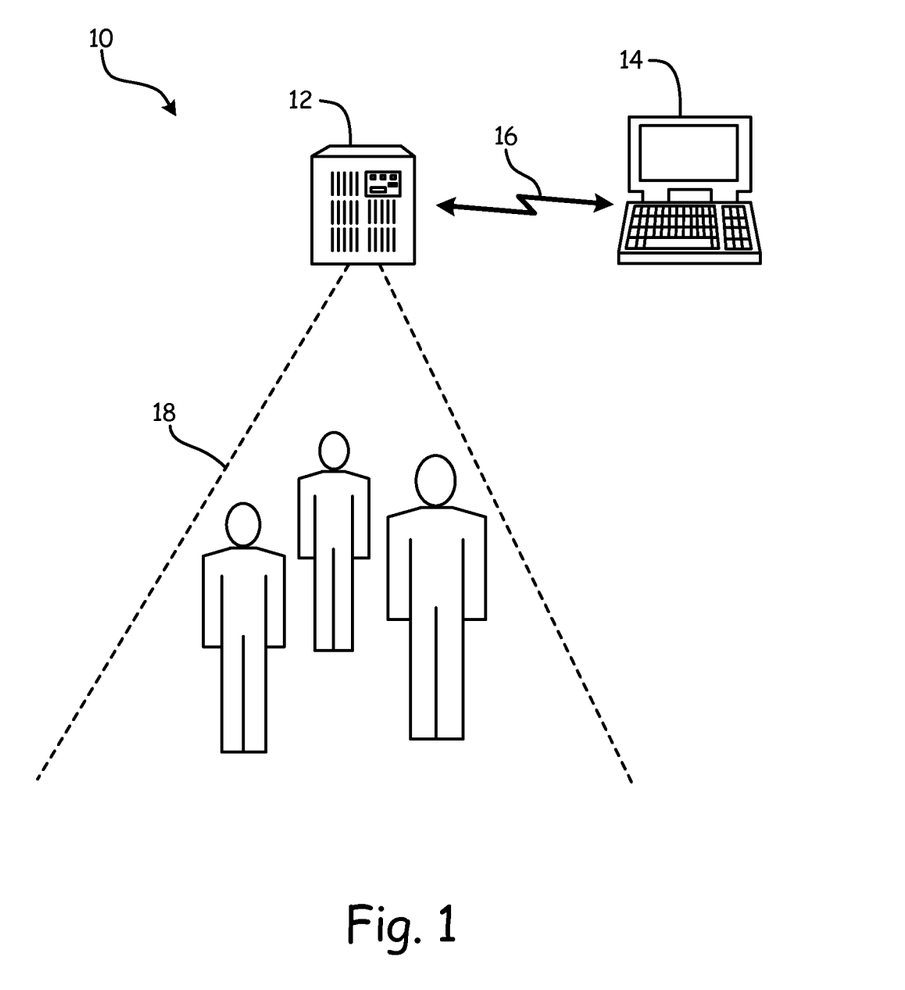
FIG. 1 is a block diagram of a deployed crowd-counting system according to an embodiment of the present invention.

FIG. 1 is a block diagram of deployed video analytic system 10 according to an embodiment of the present invention, which includes local sensing device 12, server 14, and communication link 16. In the embodiment shown in FIG. 1, local sensing device 12 is mounted to look down at a particular area (e.g., a top view). In other embodiments, however, local sensing device 12 may be positioned to provide image data at different orientations.

Local sensing device 12 is capable of capturing a plurality of different types of data, including passive visible light image data, audio data, depth stream data, and/or combinations thereof. That is, local sensing device 12 may include a passive RGB sensor, a depth stream sensor, and/or a microphone for capturing audio data. In addition, other types of sensors may be utilized depending on the application. In particular, video analytic system 10 relies on a depth stream sensor to capture depth stream information with respect to the area being monitored. A variety of different types of depth stream sensors may be employed, including time-of-flight and/or passive stereo systems that employ at least two passive cameras. In particular, a characteristic of depth stream sensors is a depth stream output that identifies—for each pixel—a distance or depth of detected objects from the sensor. In some applications, depth values are more resilient to nuisances resulting from changes in lighting and/or other factors than traditional passive, visible light sensors. It should be noted however, that various applications are better suited to different types of sensors, even within the various types of depth stream sensors, with some performing better in outdoor locations and others performing better in indoor conditions.

In the embodiment shown in FIG. 1, local sensing device 12 is configured to communicate with server 14 via communication link 16. Depending on the application requirements, communication may be wired or wireless. In one embodiment, local sensing device 12 provides raw (unprocessed) sensor data to server 14 for processing by a video analytic system. In other embodiments, local sensing device 12 includes a local processor for providing local processing of the raw sensor data. A benefit of the latter approach is that the bandwidth associated with communication channel 16 may be less than that required for transfer of raw sensor data. In particular, rather than communicating raw sensor data, local sensing device 12 may only be required to communicate the results of the locally performed analysis (e.g., number of users, events detected, etc.). In addition to requiring less bandwidth, privacy is improved by preventing communication of raw data across communication channel 16 and thereby preventing possible theft of the data en route to server 14.

Based on the collected sensor data, video analytics—whether executed locally or remotely—processes the data to identify and track individuals within the field of view of local sensing device 12. In addition, the video analytic system may generate a plurality of metrics or values associated with the processed sensor data, such as count of people entering/exiting a particular location, average speed of people, average height, etc. FIGS. 2-5 illustrate various steps/functions performed by the video analytic system to generate the desired metrics.

Figure 2:
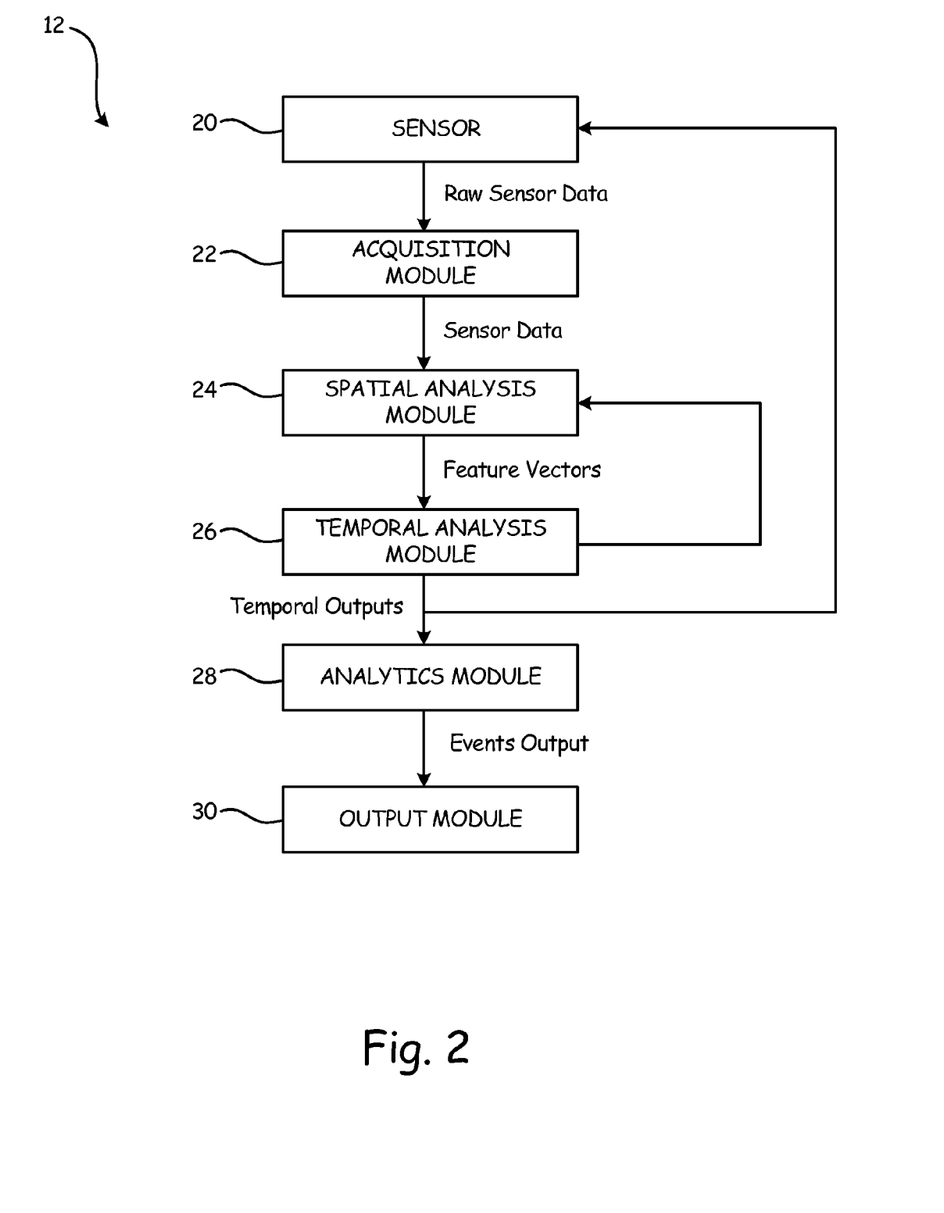
FIG. 2 is a block diagram of components and modules included in the crowd-counting system according to an embodiment of the present invention.

FIG. 2 is a block diagram of components and modules included in local sensing device 12 according to an embodiment of the present invention. As described above, in other embodiments one or more of these components may be included remotely at server 14 (shown in FIG. 1). In the embodiment shown in FIG. 2, local sensing device 12 includes sensor 20, acquisition module 22, spatial analysis module 24, temporal analysis module 26, analytics module 28, and output module 30.

Sensor 20 includes one or more sensing devices. In the embodiment shown in FIG. 2, sensor 20 is a depth stream sensor, although as described above, in other embodiments may include additional sensor types such as a passive, visible light sensor and/or audio sensor. Acquisition layer module 22 receives the raw depth stream data provided by a depth stream sensor and converts the raw depth stream data—in whatever format it is received—into a generic format.

Spatial analysis module 24 receives depth stream data from the acquisition layer module 22 and analyzes the data on a frame-by-frame basis to identify objects of interest. For each frame of data, spatial analysis module 24 generates feature vectors comprised of one or more features associated with the analyzed frame. For example, in an embodiment in which the feature to be identified is people—specifically, identification of a person's head—each feature vector would be comprised of one or more features related to an identified person. For an application in which more than one person is identified in the field of view of sensor 20, more than one feature vector is generated, one for each identified person. Each feature vector is comprised of one or more of features related to the identified person, such as center of each person's head, radius of head, depth (distance from camera) of each head, color, timestamp and/or other applicable features. Particular functions performed by spatial analysis module 24 to generate the feature vector are described with respect to FIG. 3, below. In one embodiment, each frame of data is analyzed and feature vectors calculated before the next frame of data is received from sensor 20. In this way, spatial analysis module 24 provides "real-time" analysis of received sensor data.

Temporal analysis module 26 receives the feature vectors generated by spatial analysis module 24. Whereas spatial analysis module analyzes each frame individually to generate feature vectors, temporal analysis module 26 utilizes feature vectors associated with two or more successive frames to generate temporal outputs. For example, in one embodiment temporal analysis module 26 validates identification of objects of interest (e.g., people) by spatial analysis module 24 based on assumptions of how the objects move. In addition, temporal outputs may include direction and/or speed of each detected object based on location of the identified object in successive frames. The temporal outputs generated by temporal analysis module 26 are provided to analytics module 28 for further analysis. In addition, temporal analysis module 26 may provide feedback to spatial analysis module 25 regarding objects detected to aid the operation of spatial analysis module 24. In addition, the temporal outputs may be provided to sensor 20 to aid in calibration of the one or more sensors.

Analytics module 28 receives the temporal outputs generated by temporal analysis module 26 and in response detects events and generates one or more outputs. Depending on the application, different types of events may be detected and/or outputs generated. For example, in one embodiment, a count of people entering and/or leaving a structure is desirable. Based on the people identified by temporal analysis module 26, as well as the direction and speed of each identified person, a determination can be made by analytics modules 28 regarding whether a person is entering or leaving the structure. If a person is entering a structure, the count is incremented, if the person is leaving the structure, the count is decremented. In addition, other outputs including those outputs generated by other modules (e.g., spatial analysis module 24 and/or temporal analysis module 26) may be useful, such as the average speed of people moving through the field of view of sensor 20, average height of people, etc.

Figure 3:
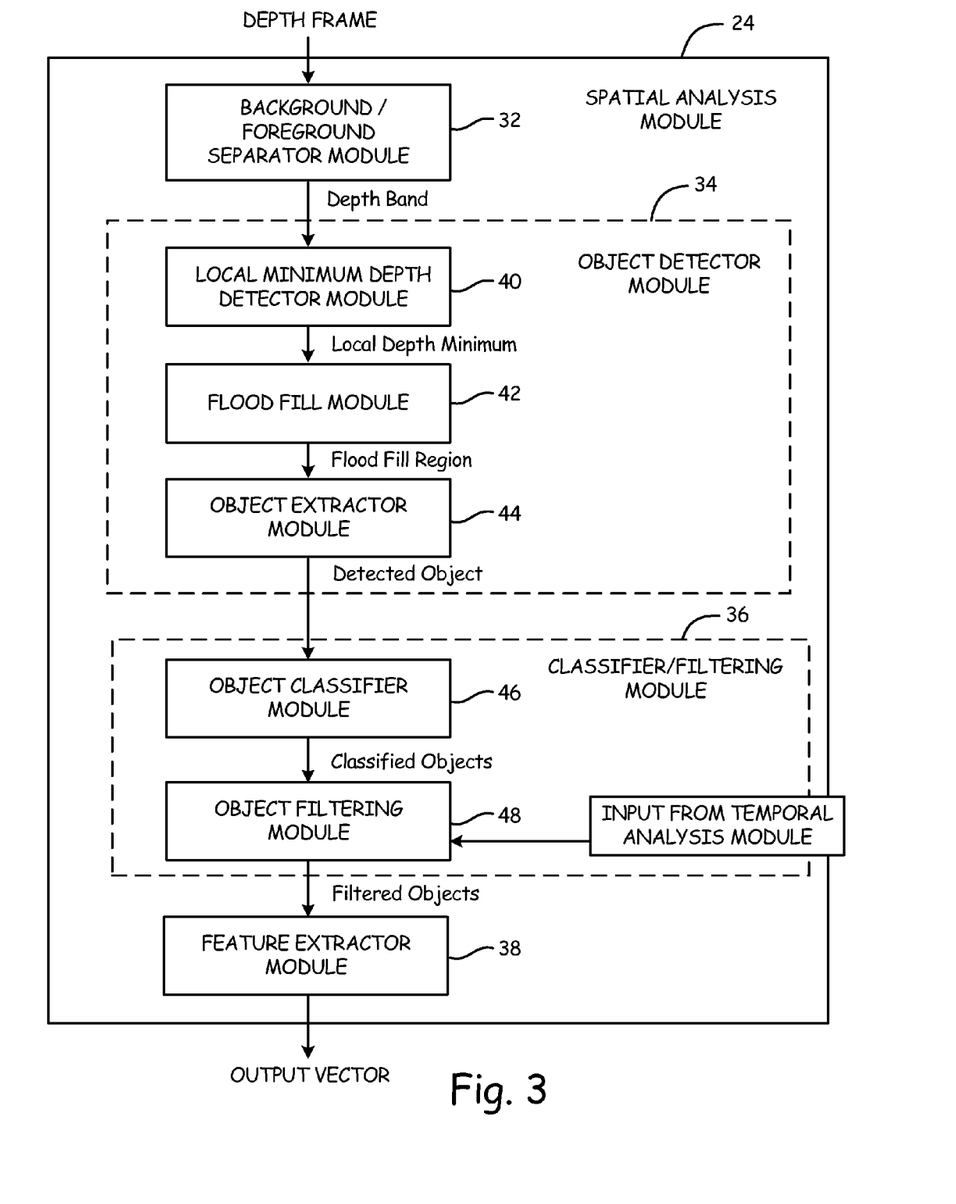
FIG. 3 is a block diagram of components and modules included in the spatial analysis module according to an embodiment of the present invention.

FIG. 3 is a block diagram illustrating modules implemented as part of spatial analysis module 24 according to an embodiment of the present invention. In the embodiment shown in FIG. 3, spatial analysis module 24 includes background/foreground separator module 32, object detector module 34, object classifier/filtering module 36, and object feature extractor module 38. In one embodiment, object detector module 34 further includes local minimum depth detector module 40, flood fill module 42, and object extractor module 44. In addition, object classifier/filtering module 36 includes object classifier module 46 and object filtering module 48.

As discussed above, spatial analysis module 24 receives depth stream data as an input. Spatial analysis module 24 receives and analyzes frames of depth stream data individually. In one embodiment, a first frame of depth stream data is processed and analyzed before reception of a second frame of depth stream data, thereby providing "real-time" processing of depth stream data.

Depth stream data provides at each pixel location in the sensor's field of view, a depth value that represents a distance between the sensor and the object located at the pixel location. For the purposes of this discussion, an exemplary application in which system 10 is deployed to count the number of people entering/exiting a premise is used. However, in different applications the particular function implemented by each module may be modified to provide the desired functionality and performance.

Background/foreground separator module 32 receives a frame of depth stream data, and separates background and foreground objects from one another via adaptive depth thresholding of the frame. For example, for applications in which sensor 20 is mounted overhead and the target objects to be detected are the heads of people, assumptions can be made regarding where in the depth frame we can expect to find these objects of interest (i.e., person's head). Based on height assumptions, adaptive depth thresholds are stored and applied by background/foreground separator module 32 to remove all those pixels not occurring at the expected height of a user's head. In this way, background objects such as the floor of the entrance can be removed from the frame, thereby preventing subsequent analysis of these pixels. In one embodiment, a minimum and maximum depth threshold is used to identify objects within a desired band of depth data. Application of adaptive depth thresholds results in only those pixels that may represent a desired object of interest (e.g., person's head) remaining for subsequent analysis. For purposes of this discussion, this band of pixel depths is referred to as a depth band, although in some embodiments it may not include both foreground and background separation. Furthermore, the depth thresholds are adaptive in the sense that they will be set as a result of factors such as location of the sensor, and expected height of objects of interest. Adaptive thresholds may be set manually or automatically.

The depth band extracted by background/foreground separator module 32 is provided to object detector module 34. In general, object detection refers to a function that identifies regions of an image that share an attribute as compared to surrounding regions (e.g., a desired object). In the field of video analytics, this is sometimes referred to as "blob" detection. Attributes may include color, shape, depth, etc. In the person counting application described with respect to FIG. 3, the objects to be identified are the heads of users. Based on the provided depth band, object detection module 34 seeks to extract one or more objects (e.g., collection of pixels of "blobs")—each selected as potentially representing a person's head. Object detection module 34 operates iteratively, identifying objects of interest and removing them from the depth frame before searching for and identifying subsequent objects. Once all objects of interest have been identified and extracted from the depth frame, object classifier/filtering module 36 verifies whether identified objects represent the desired objects (i.e., is the object extracted actually a person's head, or just a balloon floating across the camera's field of view).

In the embodiment shown in FIG. 3, object detection module 34 is comprised of a local minimum depth detector module 40, a flood fill module 42, and an object extractor module 44, which operate together to identify and extract objects of interest from the depth frame. Local minimum depth detector module 40 receives as an input the depth band, and detects within the depth band a local depth minimum—which with a ceiling mounted camera, represents the pixel located closest to the camera. As a result of the background/foreground extraction, objects occurring at a height greater than that expected for the head of user have already been removed, so it is reasonable to assume that the local minimum depth represents or could potentially represent the top of a person's head.

Flood fill module 42 receives the local depth minimum as an input, and in response locates pixels near the local depth minimum identified as part of the object of interest (e.g., person's head). In one embodiment, it is desirable to locate the area associated with the top of the person's head without including elements of the user such as shoulders, etc. In particular, it is desirable to ensure that the flood fill only include the head of one person. In one embodiment, flood fill module 42 uses a threshold fill depth to determine those pixels to be included in the flood fill. In one embodiment, the threshold fill depth may be a depth value determined as a defined depth greater than the local depth minimum. In another embodiment, a rate of change threshold associated with pixel depth is used to determine those pixels to be included in the flood fill. That is, a rate of change of depth associated with pixels should not change from positive (increasing depth farther from the camera) to negative (decreasing depth associated closer to the camera). Once a change from positive to negative is detected, only those pixels identified with the positive rate of change are included in the flood fill. A benefit of this approach is that it prevents people standing close to one another being counted as one person, rather than two. In yet another embodiment, a combination of different thresholds (e.g., depth threshold, rate of change threshold) is utilized to determine those pixels included in the flood fill. For example, the rate of change can be used to ensure that only a single person is included in each object, and then the depth thresholds can be applied to accurately define the object as the person's head.

The result of flood fill module 42 is a group of pixels—flood fill region—included as part of the detected object. Object extractor module 44 receives the flood fill region and acts to remove the region—and associated pixels—from the frame. As a result, the local minimum depth pixel associated with the identified object is removed and the process can repeat in an iterative fashion with the next local minimum depth located (by local minimum depth detector module 40) being utilized to identify another object. The iterative process continues—identifying a plurality of objects—until no more minimum values are left to analyze. Each of the extracted objects is stored for subsequent analysis by object classifier/filtering module 36.

Either once the iterative process has completed, or parallel with the identification of objects by object detection module 34, object classifier/filtering module 36 analyzes each of the identified objects to determine whether the object represents a desired object of interest (e.g., a user's head). Those objects determined to represent a desired object of interest are retained and analyzed to extract one or more features relevant to each object, while those identified as not relevant or representative of a desired object are discarded.

In particular, in the embodiment shown in FIG. 3, object classifier module 46 receives extracted objects and makes an initial determination of whether the extracted object represents a desired object. In one embodiment, object classifier module 46 utilizes features such as shape, size, and color to determine whether the object represents a desired object of interest. For example, in applications in which desired objects of interest are people's heads, the expected shape is oval-like, and can be used to determine whether the object represents a person's head. In addition, certain size thresholds (e.g., minimum, maximum sizes) can be used to determine whether the object represents a person's head. In addition, in one embodiment a combination of features are utilized to determine whether the object represents a person's head. For those objects determined to NOT represent a person's head, the object is discarded. Those objects determined to be representative of an object of interest—a classified object—are passed along to object filtering module 48.

In the embodiment shown in FIG. 3, object filtering module 48 utilizes input provided by temporal analysis module 26 to filter out objects that are not representative of a desired object. For example, in applications in which the desired object is a person, object filtering module 48 assumes that a person cannot suddenly "appear" in the middle of the frame without being seen in the previous frame. However, object filtering module 48 allows for the sudden "appearance" of a person at the image boundaries of the frame. In this example, object filtering module 48 utilizes object associations (i.e., recognition of the same object in multiple frames generated by temporal analysis module 26) to filter out objects that have been misidentified by object detector module 34. Associations between objects may be based on a number of features, such as a comparison of depth of the object and depth of objects identified in previous frames, size of the object, color of the object, etc. In this embodiment, objects that cannot be associated with objects from a previous frame are discarded. Those objects that remain—a classified/filtered objet—are provided to object feature extractor module 38 as verified desired objects (e.g., person's head).

Object feature extractor module 38 extracts features associated with each object used for analysis purposes. For example, in the crowd-counting application, features of value may include the center of each head identified, the radius of each head, the depth of the center of each head, the color associated with each head, and a timestamp associated with the head. In addition, the output vector will include identification of each object verified as directed to a desired object (i.e., the collection of pixels making up each object). These features are provided as part of an output vector associated with the depth stream frame analyzed.

Figure 4:
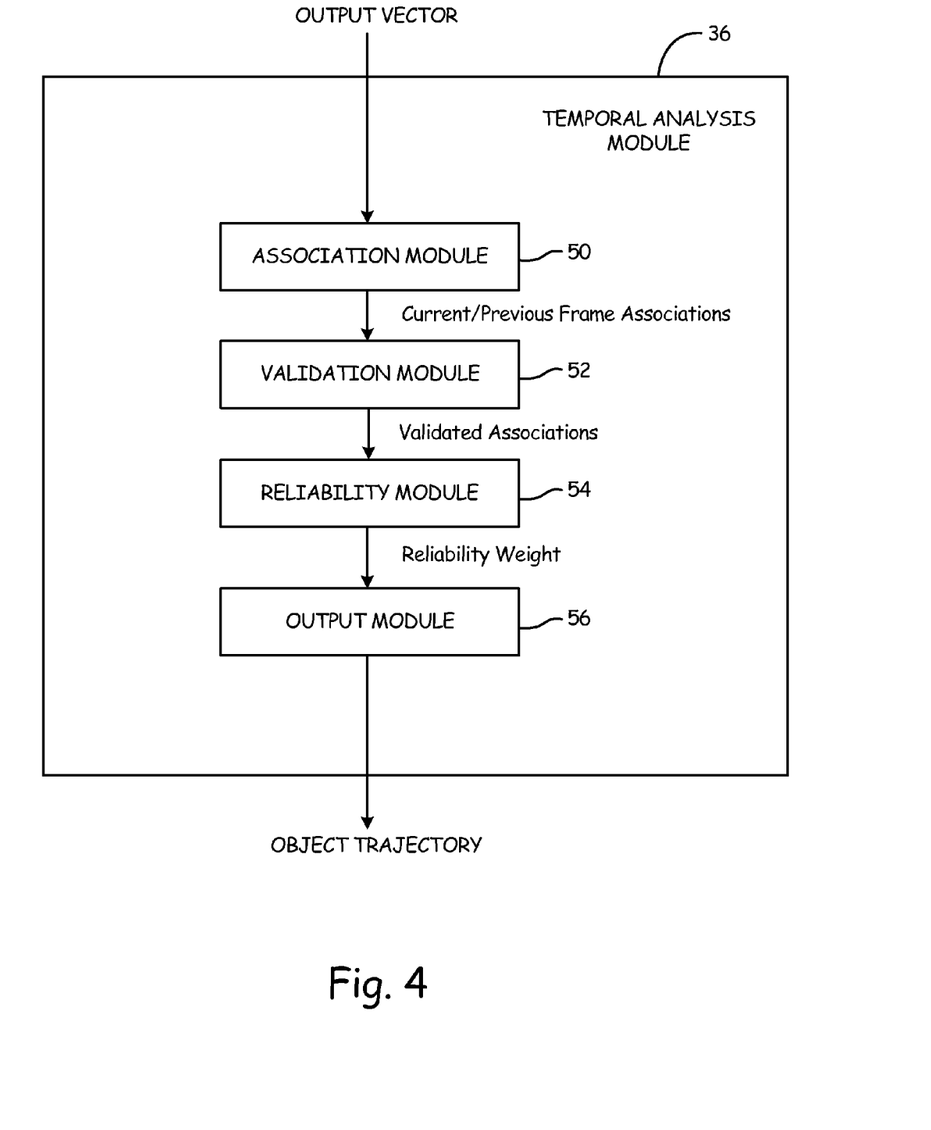
FIG. 4 is a block diagram of components and modules included in the temporal analysis module according to an embodiment of the present invention.

FIG. 4 is a block diagram illustrating modules included as part of temporal analysis module 36. In the embodiment shown in FIG. 4, temporal analysis module 36 includes association module 50, validation module 52, reliability module 54, and output module 56. In general, temporal analysis module 36 receives as input the output vectors generated by spatial analysis module 24 for each frame. Base on a comparison of output vectors from successive frames, temporal module 36 can track objects as they move through the field of view and validate the identification of the objects (e.g., verify that the objects are people).

In the embodiment shown in FIG. 4, association module 50 receives the output vector generated by spatial analysis module 36. Association module 50 compares the output vector for the current frame to output vectors from the previous frame or frames in order to associate each object identified by spatial analysis module 36 with objects identified in earlier frames. This association allows an object/person to be tracked from one frame to the next, which in turn allows determinations to be made regarding the direction and speed of the object/person. In general, assuming the frames are captured quickly enough, an association between objects in subsequent frames can be assumed based on a nearest neighbor analysis of objects in the current frame as compared with objects in the previous frame. In one embodiment, association module 50 makes a nearest neighbor determination based on the amount of overlapping pixels between an object in the current frame with objects in the previous frame, wherein the object in the current frame is associated with whichever object in the previous frame had the greatest amount of overlap. In other embodiments, association module 50 utilizes motion attributes associated with the object identified in earlier frames either alone or in conjunction with the nearest neighbor analysis to verify and/or create associations between objects. For example, motion attributes (e.g., speed, direction) of an object identified in a previous frame can be used to predict the expected location of the same object in the current frame being analyzed. The predicted or expected location of the object in the current frame can be used to create the association between objects in the previous frame with objects in the current frame, and/or can be used to verify the association made based on overlapping pixels, etc.

The associations between current frame objects and previous frame objects are provided as an input to validation module 52, which determines whether the associations made by association module 50 are accurate or valid. In one embodiment, if the association is found to be invalid, then the association between the current frame object and previous frame object is discarded, and no more analysis is performed with respect to the current frame object. In subsequent frames, the current frame object (now, a previous frame object) will be utilized to determine if a valid association can be made. In other embodiments, if an association is found to be invalid, the association is returned to association module to determine whether the current frame object can be associated with a different previous frame object.

Validation provided by validation module 52 is based on one or more features associated with the current frame object and the previous frame object, either alone or in combination. For example, in one embodiment validation module 52 utilizes color features (e.g., average color, color histogram) associated with the current frame object and the previous frame object to validate whether they are in fact the same object. If the color associated with the current frame object is different from the color associated with the previous frame object—according to a color threshold—then it can be determined that the association between the objects is inaccurate. In this embodiment, a passive visible light sensor is required in addition to the depth stream sensor to provide the color features. In another embodiment, depth features (e.g., minimum depth value, average depth value, histogram of depth data) associated with the current frame object and the previous frame object are compared for validation purposes. This assumes that the height of each object (e.g., person's head) does not change very much from frame to frame and that there is some variation in depth between objects. In another embodiment a combination of features such as color and depth may be utilized to validate as association between objects.

As discussed above, the output of validation module 52 may include only those associations that have been validated, or may include all associations, but with an indication of whether the association has been validated or not. An indication that an association has not been validated indicates that the association may not be very reliable.

Reliability module 54 receives the output provided by validation module 52 and generates with respect to each object a reliability value or weight. In one embodiment, reliability module increments a weight associated with each object that is validated by validation module 52. This requires reliability module to receive the association between the current frame object and the previous frame object in order to retrieve the weight associated with the previous frame object, as well as the validation information provided with respect to each association. In this way, the reliability weight associated with each object is incremented each time the object is verified as being present in a subsequent frame. A higher weight value indicates a more reliably tracked object. In addition, reliability module 54 may decrement (or keep the same) the weights associated with objects that were not verified, thereby indicating that the reliability of the tracked object has decreased.

The output provided by reliability module 54 includes the reliability value (e.g., weight) provided with respect to each of the current frame objects.

In the embodiment shown in FIG. 4, the output module 56 generates based on the association between the current frame object and the previous frame object an output related to the position, speed, and direction (e.g., trajectory) of the object identified by the objects. In particular, the difference in position between the current frame object and the previous frame object indicates how far the object has moved in the time between the respective frames. In another embodiment, speed and direction information calculated with respect to the previous frame object is utilized in combination with speed and direction information calculated with respect to the current frame object to average or otherwise smooth out estimates of speed and/or direction. Based on knowledge of the frame rate, and the difference in position, output module 56 can determine the direction the object is moving as well as how fast the object is moving. In addition to estimates of speed and/or direction, output module 56 may make available other outputs generated by other modules, including reliability values (i.e., weights) associated with each object, characteristics or features associated with each object, and output vectors associated with each object (e.g., center of object, radius of object, depth of center of object, color of object, etc.).

Figure 5:
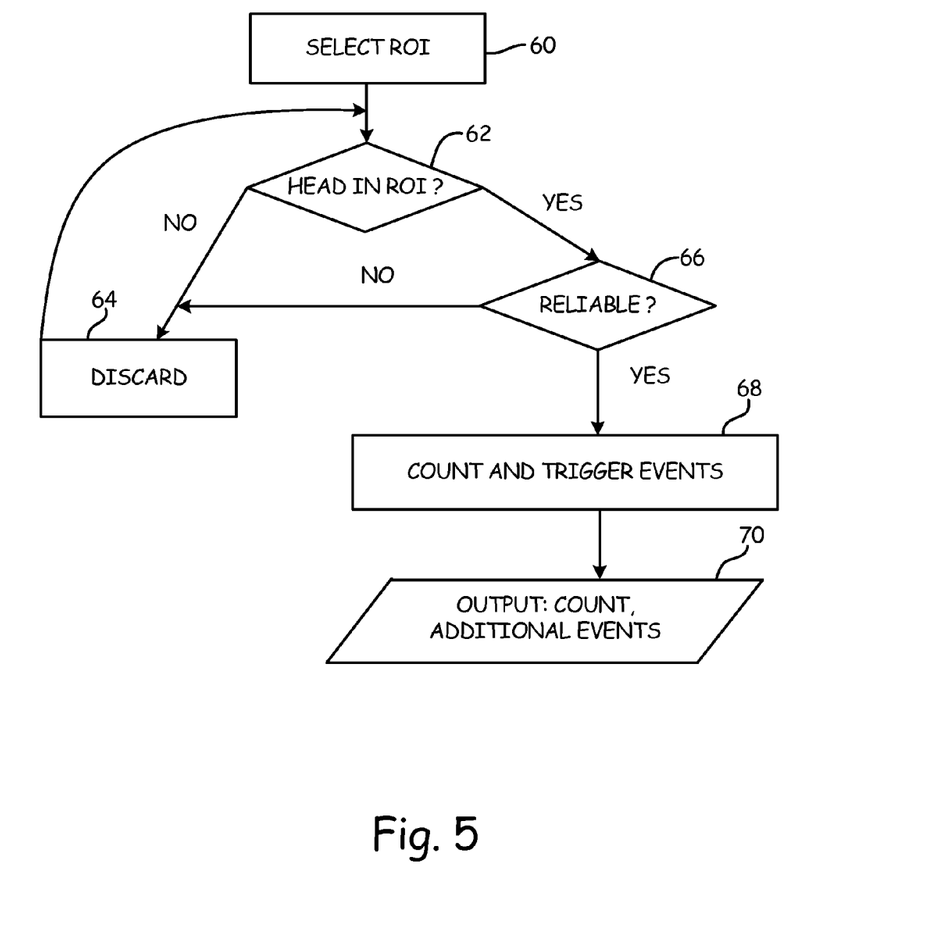
FIG. 5 is a flowchart illustrating steps performed by the analytics module according to an embodiment of the present invention.

FIG. 5 is a flow chart that illustrates an exemplary application of how the outputs generated by spatial analysis module 24 and temporal analysis module 26 can be used by analytics module 28 to solve a particular problem. For example, FIG. 5 describes an application in which the outputs are utilized to track people entering and exiting a premise, and to maintain a count of the total number of people located with the premise. In other embodiments, analytics module 28 may be configured to perform different analysis of the output provided by spatial analysis module 24 and temporal analysis module 26.

At step 60, a region of interest (ROI) is identified. In one embodiment, the entire field of view of the associated sensor is included as part of the ROI. In other embodiments, the ROI is identified within a portion of the field of view.

At step 62, a determination is made regarding whether an object of interest (e.g., a person's head) is located within the selected ROI. If no head is located within the ROI, then at step 64 the frame is discarded. If a head is detected within the ROI, then at step 66 a determination is made regarding whether the detection is reliable. In one embodiment, reliability is determined by comparing the reliability value (e.g., weights) associated with the object calculated by temporal analysis module 26 with a threshold value. For example, if a person's head has been identified and tracked over several frames before entering the ROI, then temporal analysis module 26 will have accumulated or otherwise generated a reliability or weighting value that verifies the object is a person's head. If the weighting value exceeds the threshold defined at step 62, then analysis continues at step 68. In contrast, if a person's head suddenly appears in the ROI without being previously detected, then that object will not have accumulated enough weights to exceed the threshold, and will be discarded for the time being at step 64.

At step 68, assuming the detected object is reliable, the presence of the verified object within the ROI is used to trigger an event. For example, in the crowd counting application, the location and direction of the person (as calculated by temporal analysis module 26) is utilized to determine whether the person is entering or exiting the premise. For example, if a detected object is moving in a first direction—toward an entrance—a count is incremented to indicate that a person has entered the premise. If the detected object is moving in a second direction approximately opposite the first direction then the count is decremented to indicate that a person has exited the premise. In other embodiments, other events may be triggered in response to an object moving into the ROI. For example, a person not matching a specified profile moving into a restricted area defined by the ROI may initiate an alarm. In another embodiment, detection of a person in a particular location initiates an event such as turning on lights or playing an advertisement. A person of skill in the art will appreciate that other events may be initiated in response to detection of a desired object.

At step 70, outputs are generated and/or additional events are triggered. For example, outputs may include any of the outputs generated by modules included as part of spatial analysis module 24 and/or temporal analysis module 26. For example, in the crowd-counting application, the output may include the speed and direction of the tracked people, features or characteristics (e.g., head color, depth height, size, shape, etc.) of each person's head, and/or a count of people entering/exiting the building. In addition, inputs from other sensors may be provided as part of the output. For example, an audio input from microphones mounted on the sensor can be utilized to detect abnormal events. Abnormal audio levels (either too high or too low) may indicate an alarm condition and or some other condition. One or more of these outputs is communicated to the server for storage and/or display to a user. A benefit of this approach is that it does not require communication of the raw video/sensor data. Rather, it only requires communication of outputs that may be of interest to an operator of the system.

Figure 6:
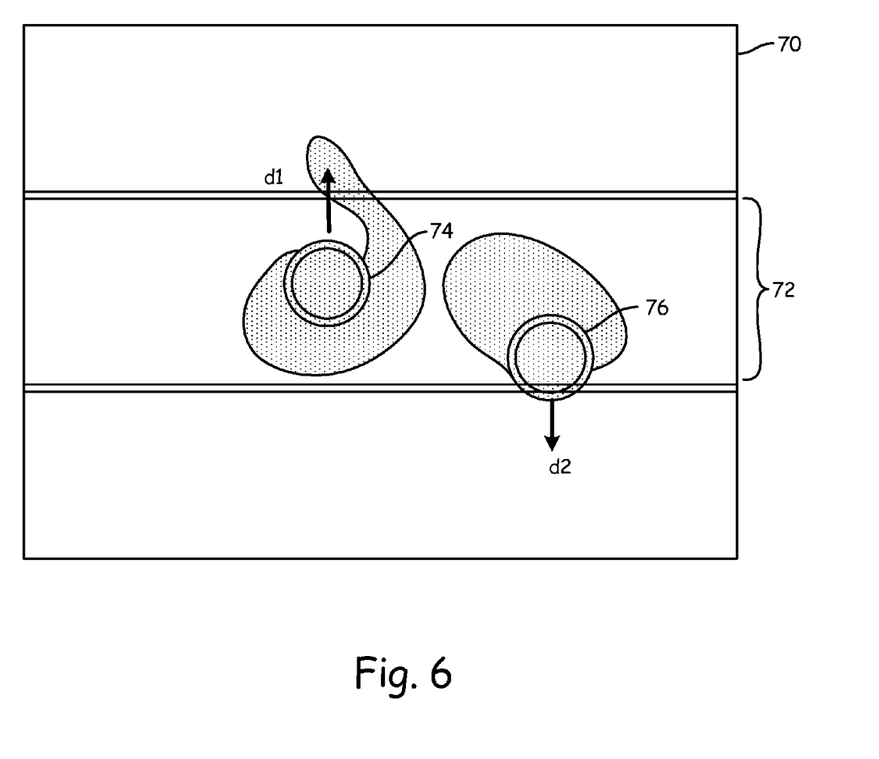
FIG. 6 is a visual representation of analysis performed by the analytics module according to an embodiment of the present invention.

FIG. 6 is a screenshot that illustrates graphically the analysis performed by analytics module 28 on a particular frame of depth stream data. Pixels within frame 70 are shaded based on depths provided in the depth stream, with darker shaded areas representing pixels closer to the sensor (for the sake of simplicity, only the outlines of two people are illustrated with shading). As discussed with respect to the flowchart illustrated in FIG. 5, analytics module 28 selects a ROI within the frame of data for analysis. In some embodiments, this may include the entire frame of data, but in the embodiment shown in FIG. 6, the ROI is selected as band 72 extending horizontally across the frame. Although spatial analysis module 24 and temporal analysis module 26 will analyze objects throughout the entire frame, analytics module 28 (responsible for counting people entering/exiting) will only analyze people located within ROI 72.

In the embodiment shown in FIG. 6, spatial analysis module 24 and temporal analysis module 26 have identified objects 74 and 76 as heads. Based on tracking information provided by temporal analysis module 26, object 74 is identified as moving in a first direction d1 and object 76 is identified as moving in a second direction d2. Analytics module 28 determines whether identified objects 74 and 76 are located within ROI 72. In the example provided, both objects 74 and 76 are identified as located within ROI 72 and are therefore further analyzed by analytics module 28. If objects 74 and 76 were located outside of ROI 72, no analysis would be performed and both objects could be discarded from the perspective of analytics module 28. In addition, although not illustrated graphically in FIG. 6, analytics module 28 will make a determination of whether objects 74 and 76 are reliable. In the example shown in FIG. 6, both objects 74 and 76 are identified as reliable.

Next, analytics module 28 determines how to count objects 74 and 76. In the example illustrated, trajectory information (provided by temporal analysis module 26) indicates that object 74 is moving in a first direction d1 (toward an exit) and therefore results in the analytics module 28 decrementing a count of people within the premise. However, trajectory information indicates that object 76 is moving in a second direction d2 (toward an entrance) and therefore results in the analytics modules 28 incrementing a count of people within the premise.

In addition to a simple count of people entering/exiting a premise, the information provided with respect to objects 74 and 76 may be used to initiate other events and/or used to generate other metrics or features. For example, detection of a person entering the premise may result in activation of a welcome sequence. Additional metrics or features that may be of interest include average speed of users, average number of users entering/exiting according to time of day, average height of users, size/shape of user's heads, etc. In addition, other inputs such as an audio input may be used in conjunction with information provided with respect to objects to initiate events and/or alarms.

One non-limiting aspect according to the present disclosure is directed to a video analytic system that includes a depth stream sensor, a spatial analysis module, a temporal analysis module, and an analytics module. The depth stream sensor collects depth stream data. The spatial analysis module is connected to receive and analyze the depth stream data on a frame by frame basis, wherein the spatial analysis module iteratively identifies objects of interest based on local maximum or minimum depth stream values within each frame, removes identified objects of interest, and repeats until all objects of interest have been identified. The temporal analysis module is connected to receive objects of interest identified by the spatial analysis module in a frame, wherein the temporal analysis module associates each object of interest in the current frame with an object of interest identified in a previous frame, wherein the temporal analysis module utilizes the association between current frame objects of interest and previous frame objects of interest to generate temporal features related to each object of interest. The analytics module is connected to receive the temporal features generated by the temporal analysis module, wherein the analytics module detects events based on the received temporal features.

In one non-limiting embodiment, the spatial analysis module includes a separator module that applies an adaptive depth threshold to remove those pixels located in a depth range not likely to correspond to objects of interest.

In another non-limiting embodiment, a separator module is a background/foreground separator module that applies a minimum adaptive depth threshold and maximum adaptive depth threshold to remove those pixels associated with background or foreground objects.

In another non-limiting embodiment, the spatial analysis module includes a local minimum depth detector module that identifies within the remaining pixels a minimum depth pixel corresponding to an object located closest to the depth stream sensor.

In another non-limiting embodiment, the spatial analysis module includes a flood fill module that receives a minimum depth pixel and identifies or fills neighboring pixels that should be included as part of the identified object of interest.

In another non-limiting embodiment, a flood fill module utilizes a threshold fill depth that identifies or fills all pixels located within a minimum depth of the minimum depth associated with the identified object.

In another non-limiting embodiment, a flood fill module utilizes a rate of change threshold associated with pixel depth to determine those pixels to be included as part of the identified object.

In another non-limiting embodiment, a flood fill module utilizes a combination of threshold fill depth and rate of change thresholds to identify those pixels to be included as part of the identified object.

In another non-limiting embodiment, all pixels identified by as part of the identified object are removed from the current frame and stored as a detected object of interest.

In another non-limiting embodiment, following removal of an identified object form the current frame, the minimum depth detector module detects a subsequent minimum depth pixel and provides the subsequently detected minimum depth pixel to the flood fill module to identify another object of interest, until no additional minimum depth pixels remain.

In another non-limiting embodiment, a spatial analysis module includes a classifier module that uses one or more features associated with each identified object of interest to determine whether the object of interest has been correctly identified.

In another non-limiting embodiment, a spatial analysis module includes a filtering module that receives input from the temporal analysis module regarding objects of interest identified in previous frames to determine whether each object of interest in the current frame has been correctly identified.

In another non-limiting embodiment, a classifier module compares features associated with each object of interest with expected features, wherein features include one or more of size, shape, and color of the object of interest.

In another non-limiting embodiment, a filtering module discards an object of interest appearing in the current frame that cannot be associated with an object of interest appearing in a previous frame.

In another non-limiting embodiment, a temporal analysis module includes an association module connected to receive information about each object of interest identified by the spatial analysis module with respect to the current frame, wherein the association module compares current frame objects of interest with previous frame objects of interest and associates a current frame object of interest with a previous frame object of interest.

In another non-limiting embodiment, a temporal analysis module includes a validation module that validates that the current frame object of interest and previous frame object of interest refer to the same object.

In another non-limiting embodiment, a temporal analysis module includes a reliability module determines a reliability value associated with each detected object of interest based, in part, on a number of frames in which the object has been tracked and associated with previous frame objects of interest.

In another non-limiting embodiment, a temporal analysis module includes an output module configured to calculate attributes of each object of interest based on associations between current frame objects of interest and previous frame objects of interest.

In another non-limiting embodiment, an association module generates an association between a current frame object of interest and a previous frame object of interest based on proximity of the objects of interest to one another.

In another non-limiting embodiment, an association module generates an association between the current frame object of interest and the previous frame object of interest based, in addition, on attributes associated with each object of interest.

In another non-limiting embodiment, an association module generates an association between the current frame object of interest and the previous frame object of interest based, in addition, on motion attributes associated with each object of interest including one or more of direction and velocity.

In another non-limiting embodiment, a validation module utilizes features associated with a current frame object of interest and features associated with a previous frame object of interest to verify that the association is made between the same object, wherein features utilized to verify the association include one or more of size, shape, depth, and color of the current frame object of interest and previous frame object of interest.

In another non-limiting embodiment, am output module calculates attributes including speed and direction of the object of interest.

In another non-limiting embodiment, a spatial analysis module is configured to identify as an object of interest a user's head, wherein the minimum depth detector module recognizes a minimum depth value as representing a top of user's head, and wherein the flood fill module identifies neighboring pixels identified as part of the user's head.

In another non-limiting embodiment, a classifier module validates identification of objects of interest as a user's head based on one or more features associated with each object as compared with expected values, wherein features include one or more of size and shape.

In another non-limiting embodiment, features extracted with respect to each object of interest include center, radius, depth of center, and color associated with each user's head.

In another non-limiting embodiment, outputs generated by the analytics module are communicated to a server remotely located from depth stream sensor, the spatial analysis module, the temporal analysis module, and the analytics module via wired or wireless communication, without requiring communication of the raw data captured by the depth stream sensor.

One non-limiting aspect according to the present disclosure is directed to a crowd-counting device that includes a depth stream senor configured to capture frames of depth stream data that indicates at each pixel a depth or distance to the depth stream sensor.

In another non-limiting embodiment, the crowd-counting device includes a spatial analysis module connected to receive depth stream data captured by the depth stream sensor, wherein the spatial analysis module analyzes each frame of depth stream data to identify objects corresponding with user's heads.

In another non-limiting embodiment, the spatial analysis module utilizes a minimum depth pixel to identify a top portion of a user's head, flood fills pixels surrounding the minimum depth pixel corresponding with the user's head, removes the portion representing the user's head from the frame, and iteratively repeats the process until all objects have been identified and removed from the frame, wherein for each identified user head the spatial analysis module creates an output vector that identifies features associated with the user's head.

In another non-limiting embodiment, the crowd-counting device includes a temporal analysis module compares output vectors generated with respect to a current frame with output vectors generated with respect to a previous frame in order to generate attributes of location and direction with respect to each detected user head.

In another non-limiting embodiment, the crowd-counting device includes an analytics module that increments and decrements a count of users based on location and direction information provided by the temporal analysis module.

In another non-limiting embodiment, the crowd-counting device flood fills pixels based on a threshold fill depth that identifies or fills all pixels located within a minimum depth of the minimum depth associated with the identified object.

In another non-limiting embodiment, the crowd-counting device utilizes a rate of change threshold associated with pixel depth to determine those pixels to be included as part of the identified object.

In another non-limiting embodiment, the crowd-counting device includes verifies objects identified as user's heads by comparing features of each object to expected features, wherein features include size and shape.

In another non-limiting embodiment, the crowd-counting device includes verifies objects identified as user's heads via tracking information provided by the temporal analysis module.

In another non-limiting embodiment, the crowd-counting device associates each user head identified in a current frame with a user head identified in a previous frame based on proximity in location.

In another non-limiting embodiment, the crowd-counting device associates a current frame user head with one of the previous frame user heads based on maximum overlap with the current frame user head.

In another non-limiting embodiment, the crowd-counting device validates the association between each current frame user head and previous frame user head based on features associated with each, wherein features include one or more of size, shape, depth, and color of each user head.

In another non-limiting embodiment, the crowd-counting device assigns a reliability weight to each user head based on number of times the user head has been identified in frames of data.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A video analytic system comprising:
 a depth stream sensor that collects depth stream data;
 a spatial analysis module connected to receive and analyze the depth stream data on a frame by frame basis, wherein the spatial analysis module iteratively identifies objects of interest based on local maximum or minimum depth stream values within each frame, removes identified objects of interest, and repeats until all objects of interest have been identified, wherein the spatial analysis module comprises:
  a separator module that applies an adaptive depth threshold to remove those pixels located in a depth range not likely to correspond to objects of interest;
  a local minimum depth detector module that identifies within the remaining pixels a minimum depth pixel corresponding to an object located closest to the depth stream sensor; and
  a flood fill module that receives the minimum depth pixel from the minimum depth detector and identifies or fills neighboring pixels that should be included as part of the identified object of interest;
 a temporal analysis module connected to receive objects of interest identified by the spatial analysis module in a frame, wherein the temporal analysis module associates each object of interest in the current frame with an object of interest identified in a previous frame, wherein the temporal analysis module utilizes the association between current frame objects of interest and previous frame objects of interest to generate temporal features related to each object of interest; and an analytics module connected to receive the temporal features generated by the temporal analysis module, wherein the analytics module detects events based on the received temporal features.

2. The video analytic system of claim 1, wherein the separator module is a background/foreground separator module that applies a minimum adaptive depth threshold and maximum adaptive depth threshold to remove those pixels associated with background or foreground objects.

3. The video analytic system of claim 1, wherein the flood fill module utilizes a threshold fill depth that identifies or fills all pixels located within a minimum depth of the minimum depth associated with the identified object.

4. The video analytic system of claim 1, wherein the flood fill module utilizes a rate of change threshold associated with pixel depth to determine those pixels to be included as part of the identified object.

5. The video analytic system of claim 1, wherein the flood fill module utilizes a combination of threshold fill depth and rate of change thresholds to identify those pixels to be included as part of the identified object.

6. The video analytic system of claim 1, wherein all pixels identified by the flood fill module as part of the identified object are removed from the current frame and stored as a detected object of interest.

7. The video analytic system of claim 6, wherein following removal of an identified object form the current frame, the minimum depth detector module detects a subsequent minimum depth pixel and provides the subsequently detected minimum depth pixel to the flood fill module to identify another object of interest, until no additional minimum depth pixels remain.

8. The video analytic system of claim 1, wherein the spatial analysis module further includes:
a classifier module that uses one or more features associated with each identified object of interest to determine whether the object of interest has been correctly identified; and
a filtering module that receives input from the temporal analysis module regarding objects of interest identified in previous frames to determine whether each object of interest in the current frame has been correctly identified.

9. The video analytic system of claim 8, wherein the classifier module compares features associated with each object of interest with expected features, wherein features include one or more of size, shape, and color of the object of interest.

10. The video analytic system of claim 8, wherein the filtering module discards an object of interest appearing in the current frame that cannot be associated with an object of interest appearing in a previous frame.

11. The video analytic system of claim 1, wherein the temporal analysis module includes:
an association module connected to receive information about each object of interest identified by the spatial analysis module with respect to the current frame, wherein the association module compares current frame objects of interest with previous frame objects of interest and associates a current frame object of interest with a previous frame object of interest;
a validation module connected to receive the associations made by the association module, wherein the validation module validates that the current frame object of interest and previous frame object of interest refer to the same object;
a reliability module connected to receive the validated associations from the validation module, wherein the reliability module determines a reliability value associated with each detected object of interest based, in part, on a number of frames in which the object has been tracked and associated with previous frame objects of interest; and
an output module configured to calculate attributes of each object of interest based on associations between current frame objects of interest and previous frame objects of interest.

12. The video analytic system of claim 8, wherein the spatial analysis module is configured to identify as an object of interest a user's head, wherein the minimum depth detector module recognizes a minimum depth value as representing a top of user's head, and wherein the flood fill module identifies neighboring pixels identified as part of the user's head.

13. The video analytic system of claim 12, wherein the classifier module validates identification of objects of interest as a user's head based on one or more features associated with each object as compared with expected values, wherein features include one or more of size and shape.

14. The video analytic system of claim 12, wherein features extracted with respect to each object of interest include center, radius, depth of center, and color associated with each user's head.

15. The video analytics system of claim 1, wherein outputs generated by the analytics module are communicated to a server remotely located from depth stream sensor, the spatial analysis module, the temporal analysis module, and the analytics module via wired or wireless communication, without requiring communication of the raw data captured by the depth stream sensor.

16. A crowd-counting device comprising:
a depth stream sensor configured to capture frames of depth stream data that indicates at each pixel a depth or distance to the depth stream sensor;
a spatial analysis module connected to receive depth stream data captured by the depth stream sensor, wherein the spatial analysis module analyzes each frame of depth stream data to identify objects corresponding with user's heads, wherein the spatial analysis module, wherein the spatial analysis module utilizes a minimum depth pixel to identify a top portion of a user's head, flood fills pixels surrounding the minimum depth pixel corresponding with the user's head, removes the portion representing the user's head from the frame, and iteratively repeats the process until all objects have been identified and removed from the frame, wherein for each identified user head the spatial analysis module creates an output vector that identifies features associated with the user's head, wherein the spatial analysis module flood fills pixels based on a threshold fill depth that identifies or fills all pixels located within a minimum depth of the minimum depth associated with the identified object;
a temporal analysis module connected to receive the output vectors generated by the spatial analysis module, wherein the temporal analysis module compares output vectors generated with respect to a current frame with output vectors generated with respect to a previous frame in order to generate attributes of location and direction with respect to each detected user head; and
an analytics module that increments and decrements a count of users based on location and direction information provided by the temporal analysis module.

17. The crowd-counting device of claim 16, wherein the spatial analysis module verifies objects identified as user's heads by comparing features of each object to expected features, wherein features include size and shape.

18. The crowd-counting device of claim 17, wherein the spatial analysis module further verifies objects identified as user's heads via tracking information provided by the temporal analysis module.

19. The crowd-counting device of claim 16, wherein the temporal analysis module associates each user head identified in a current frame with a user head identified in a previous frame based on proximity in location.

20. The crowd-counting device of claim 19, wherein the temporal analysis module associates a current frame user head with one of the previous frame user heads based on maximum overlap with the current frame user head.

21. The crowd-counting device of claim 19, wherein the temporal analysis module validates the association between each current frame user head and previous frame user head based on features associated with each, wherein features include one or more of size, shape, depth, and color of each user head.

22. The crowd-counting device of claim 19, wherein the temporal analysis module assigns a reliability weight to each user head based on number of times the user head has been identified in frames of data.

23. A video analytic system comprising:
a depth stream sensor that collects depth stream data;
a spatial analysis module connected to receive and analyze the depth stream data on a frame by frame basis, wherein the spatial analysis module iteratively identifies objects of interest based on local maximum or minimum depth stream values within each frame, removes identified objects of interest, and repeats until all objects of interest have been identified;
a temporal analysis module connected to receive objects of interest identified by the spatial analysis module in a frame, wherein the temporal analysis module associates each object of interest in the current frame with an object of interest identified in a previous frame, wherein the temporal analysis module utilizes the association between current frame objects of interest and previous frame objects of interest to generate temporal features related to each object of interest, wherein the temporal analysis module comprises:
an association module connected to receive information about each object of interest identified by the spatial analysis module with respect to the current frame, wherein the association module compares current frame objects of interest with previous frame objects of interest and associates a current frame object of interest with a previous frame object of interest;
a validation module connected to receive the associations made by the association module, wherein the validation module validates that the current frame object of interest and previous frame object of interest refer to the same object;
a reliability module connected to receive the validated associations from the validation module, wherein the reliability module determines a reliability value associated with each detected object of interest based, in part, on a number of frames in which the object has been tracked and associated with previous frame objects of interest; and
an output module configured to calculate attributes of each object of interest based on associations between current frame objects of interest and previous frame objects of interest; and an analytics module connected to receive the temporal features generated by the temporal analysis module, wherein the analytics module detects events based on the received temporal features.

24. The video analytic system of claim 23, wherein the association module generates an association between a current frame object of interest and a previous frame object of interest based on proximity of the objects of interest to one another.

25. The video analytic system of claim 24, wherein the association module generates an association between the current frame object of interest and the previous frame object of interest based, in addition, on attributes associated with each object of interest.

26. The video analytic system of claim 24, wherein the association module generates an association between the current frame object of interest and the previous frame object of interest based, in addition, on motion attributes associated with each object of interest including one or more of direction and velocity.

27. The video analytic system of claim 23, wherein the validation module utilizes features associated with a current frame object of interest and features associated with a previous frame object of interest to verify that the association is made between the same object, wherein features utilized to verify the association include one or more of size, shape, depth, and color of the current frame object of interest and previous frame object of interest.

28. The video analytic system of claim 23, wherein the output module calculates attributes including speed and direction of the object of interest.

29. A crowd-counting device comprising:
a depth stream sensor configured to capture frames of depth stream data that indicates at each pixel a depth or distance to the depth stream sensor;
a spatial analysis module connected to receive depth stream data captured by the depth stream sensor, wherein the spatial analysis module analyzes each frame of depth stream data to identify objects corresponding with user's heads, wherein the spatial analysis module, wherein the spatial analysis module utilizes a minimum depth pixel to identify a top portion of a user's head, flood fills pixels surrounding the minimum depth pixel corresponding with the user's head, removes the portion representing the user's head from the frame, and iteratively repeats the process until all objects have been identified and removed from the frame, wherein for each identified user head the spatial analysis module creates an output vector that identifies features associated with the user's head, wherein the spatial analysis module utilizes a rate of change threshold associated with pixel depth to determine those pixels to be included as part of the identified object;
a temporal analysis module connected to receive the output vectors generated by the spatial analysis module, wherein the temporal analysis module compares output vectors generated with respect to a current frame with output vectors generated with respect to a previous frame in order to generate attributes of location and direction with respect to each detected user head; and
an analytics module that increments and decrements a count of users based on location and direction information provided by the temporal analysis module.

30. The crowd-counting device of claim 29, wherein the spatial analysis module verifies objects identified as user's heads by comparing features of each object to expected features, wherein features include size and shape.

31. The crowd-counting device of claim 30, wherein the spatial analysis module further verifies objects identified as user's heads via tracking information provided by the temporal analysis module.

32. The crowd-counting device of claim 29, wherein the temporal analysis module associates each user head identified in a current frame with a user head identified in a previous frame based on proximity in location.

33. The crowd-counting device of claim 32, wherein the temporal analysis module associates a current frame user head with one of the previous frame user heads based on maximum overlap with the current frame user head.

34. The crowd-counting device of claim 32, wherein the temporal analysis module validates the association between each current frame user head and previous frame user head based on features associated with each, wherein features include one or more of size, shape, depth, and color of each user head.

35. The crowd-counting device of claim 32, wherein the temporal analysis module assigns a reliability weight to each user head based on number of times the user head has been identified in frames of data.

\* \* \* \* \*